United States Patent [19]
Thandiwe

[11] Patent Number: 5,594,319
[45] Date of Patent: Jan. 14, 1997

[54] BATTERY PACK HAVING THEFT DETERRENT CIRCUIT

[75] Inventor: Iilonga P. Thandiwe, Atlanta, Ga.

[73] Assignee: Motorola, Inc., Schaumburg, Ill.

[21] Appl. No.: 664,925

[22] Filed: Jun. 5, 1996

[51] Int. Cl.⁶ .............................. H02J 7/00; H01M 10/44
[52] U.S. Cl. ........................ 320/2; 320/15; 320/29; 320/30; 320/49; 320/54
[58] Field of Search .................... 320/2, 15, 48, 320/30, 49, 54, 29

[56] References Cited

U.S. PATENT DOCUMENTS 5,073,767  12/1991  Holmes et al. ................. 340/311.1
5,179,337  1/1993   Staarman et al. ............... 320/13
5,189,400  2/1993   Schultz .......................... 320/48 X
5,371,453  12/1994  Fernandez ...................... 320/5

Primary Examiner—Peter S. Wong
Assistant Examiner—K. Shin
Attorney, Agent, or Firm—Kenneth M. Massaroni

[57] ABSTRACT

A battery pack (10) has a memory (26) for storing a password. Upon connecting to a host device (12), or similar load, the battery waits for a data word to be communicated from the host device over a communications channel (22). If an incorrect data word is received a predetermined number of time, or if an initial power time period, as defined by a timer (30), is reached, a switch (16) is opened, thereby disconnecting the battery cell or cells (14) from the load.

12 Claims, 1 Drawing Sheet

BATTERY PACK HAVING THEFT DETERRENT CIRCUIT

TECHNICAL FIELD

The inventions relates in general to battery packs, and more particularly to battery packs having switches for disconnecting from a load.

BACKGROUND

Until recently batteries and battery packs for portable devices have been viewed somewhat as low technology level components of more sophisticated systems. Certainly this is true when the battery pack is compared to a host device such as portable, or "laptop" computers, cellular phones, and two way hand held radios. Virtually all such devices employ microcontrollers and sophisticated software to control various functions and perform various tasks, while battery packs for these devices have traditionally been low technology components. This has resulted in the host device being by far the most valuable component of a system. Accordingly, devices such as, for example, laptop computers, have been the target of theft at an increasing rate.

To deter theft of these devices, certain measures have been taken. For example, cellular phones have unique identifiers which prevent unauthorized individuals from establishing fraudulent communications links, and software is used by many devices to "lock out" unauthorized users with password protection. For the most part, battery packs have not been seen as a lucrative item for such pilferage, and no theft deterrent measures have been employed in battery packs. However, with the advent of "smart" battery packs, this will likely change.

Smart battery packs are battery packs that contain sophisticated circuitry, such as a microprocessor or equivalent. The utility of such battery packs has been proven in the marketplace, and they perform a variety of functions such capacity or "fuel" gauging, charge control, and safety to name but a few. It has been found that the higher cost of these high technology battery packs is outweighed by the increase in efficiency yielded by the electronics. This has made smart battery packs desirable in many markets, particularly portable computers. Since smart battery packs are significantly more valuable than their low technology predecessors, it is likely that theft of such battery packs will increase as well. Therefore, there exists a need in a smart battery pack for a theft deterrent circuit, and particularly one which disables the battery pack from unauthorized use.

BRIEF DESCRIPTION OF THE DRAWING

The drawing is a block diagram of a battery pack having a theft deterrent circuit in accordance with the invention.

DETAILED DESCRIPTION OF THE PREFERRED EMBODIMENT

Figure 1:
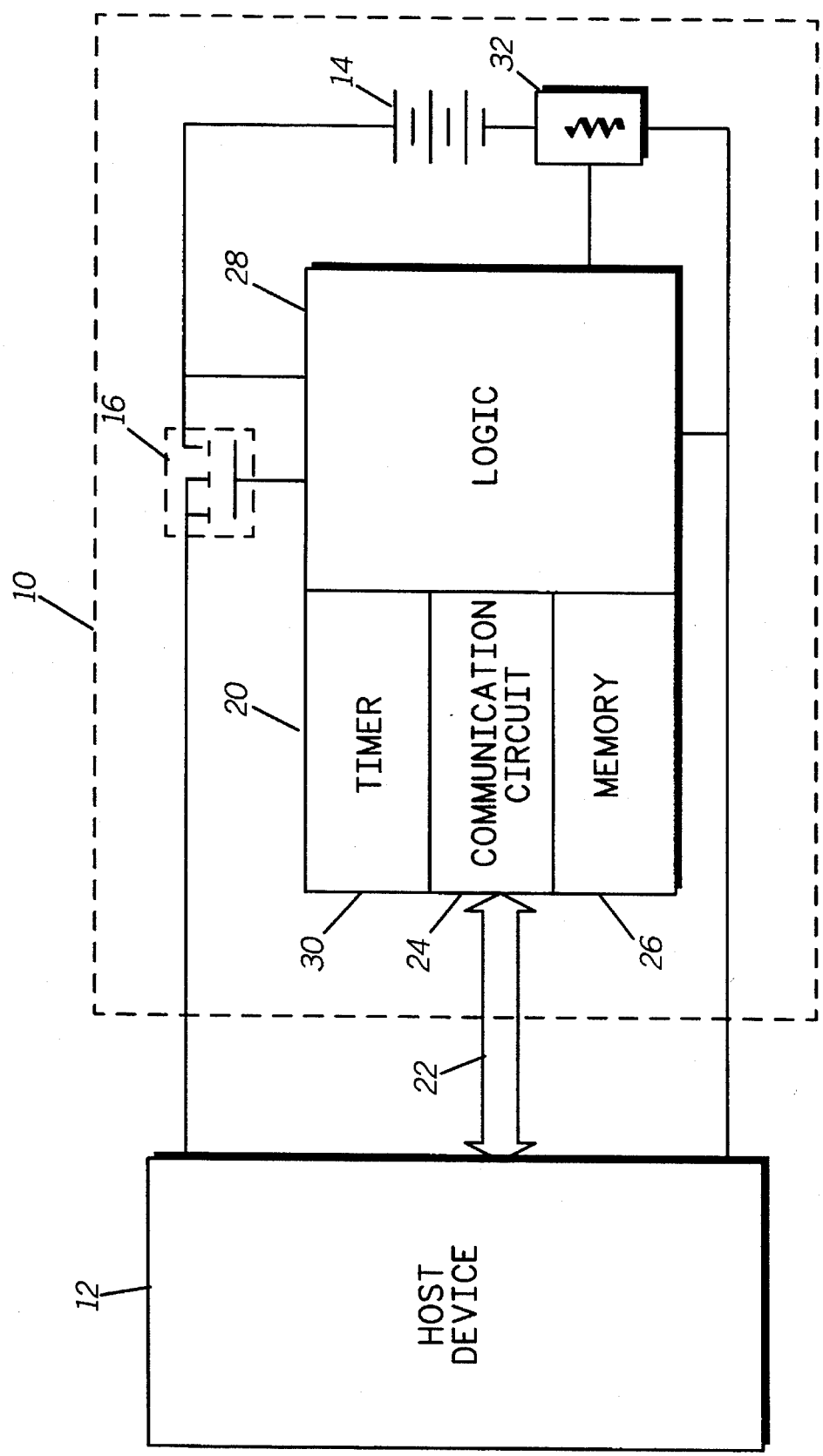

While the specification concludes with claims defining the features of the invention that are regarded as novel, it is believed that the invention will be better understood from a consideration of the following description in conjunction with the drawing figures, in which like reference numerals are carried forward.

Referring now to the drawing, there is illustrated therein a block diagram of a battery pack 10 in accordance with the invention, that is connected to a host device 12. The battery pack comprises at least one battery cell 14 for providing power to the host device. The battery cell or cells, along with the associated interconnection circuitry, and electronic circuits described herein are housed in a battery pack housing, which is typically fabricated from molded plastic. A switch 16 is coupled in series with the battery cell or cells, and is operable in either a closed, conductive state, and an open, non-conductive state. Changing the switch state from closed to open is referred to a "opening", while "closing" the switch refers to changing the switch state from open to closed. In the preferred embodiment the switch is a transistor, and in particular a MOSFET (metallic oxide semiconductor field effect transistor). The switch is also connected to a control circuit, such as, preferably, a microcontroller circuit 20, and is responsive to a signal provided by the control circuit. By microcontroller circuit, it is meant a circuit that comprises a microcontroller or microprocessor, along with support circuitry, such as drivers, oscillators, and circuits which typically interface between the microcontroller and other circuits..

In operation, the battery pack, once connected to the host device, receives a data word from the host device over a communications channel 22, such as a conductor bus or optical link, as is known in the art. Many busses are known in the art, and examples include SMB (system management bus), SCSI (small computer systems interface), and various 2 and 3 wire buses. A communications circuit 24 in the battery pack, and part of the microcontroller circuit, receives the data word over the channel 22. The data word is compared to a password stored in a memory 26 by some means for comparing, such as a logic circuit 28, which is also part of the microcontroller circuit. Upon a predetermined number of occurrences of the data word differing from the password, a means for controlling the switch, which may also be the logic circuit, will open the switch 16. That is, if an incorrect data word is received, one that is not exactly the same as the password, the battery pack may allow a predetermined number of incorrect data words before disconnecting power from the host device. Similar password protection schemes for computers allow two or three failed attempts before disabling the computer. It is left as a design choice to determine the particular number of such occurrences before the battery pack is disabled.

In practice, upon connecting the battery pack to the host device and powering up the host device, the battery pack will detect the presence of the host device. The simplest way to detect the host device is by monitoring current, such as with a current sense element 32, which is typically a resistor. The battery pack then prompts the host device to send a data word, and in turn, the host device prompts the user to enter a data word. The host device then communicates the entered data word to the battery pack. If the data word does not match the password, the battery pack may signal the host device, which in turn prompts the user again. This continues until either the user enters the correct data word, or the battery pack disables itself. A timer 30 begins timing an initial power time period which allows power to be drawn for a predetermined time period. If the correct data word matching the password is not received within the initial power time period, or if an incorrect data word is entered enough times, the switch is opened, thereby disconnecting the battery pack from any connected load.

To prevent the battery pack from disabling itself permanently, the timer 30 also defines a lock out time period. Upon the switch being opened, the timer begins counting, or timing for a predetermined duration. Once the lock out time period expires, the switch is closed again. If the battery pack detects the host device or other load, the process starts over.

Timer circuits are employed in a wide variety of application, and are well know. In particular, many microcontrollers have integral timers, and many timer integrated circuits (IC) exist, such as the well known "555" timer IC.

The form of the data word and password is preferably a multi-byte digital string. It is not uncommon in similar lock out applications for the password to be up to 10 bytes long, each byte being, for example, an ASCII character. To store the password, it is preferable that the memory be a non-volatile type, and in particular an EEPROM (electrically erasable programmable read only memory). The password may either be set upon assembly of the battery, or the software of the host device and software in the microcontroller circuit may work cooperatively to allow changes so that, upon entering a correct data word, the authorized user may select a new password.

A typical process for operating a battery pack in accordance with the invention involves the following steps: detecting the occurrence of electrically connecting the battery pack with the host device, or other load; timing an initial power time period beginning upon completing the step of detecting; receiving a data word from the host device upon completing the step of detecting; comparing the data word with the password upon completing the step of receiving; and opening the switch upon either a predetermined number of occurrences of the data word differing from the password, or the expiration of the initial power period. Preferably, beginning a lock out time period upon performing the step of opening, and closing the switch after expiration of the lock out time period are steps also included.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery pack, for use with a host device, having a battery current discharge prevention circuit, said battery pack comprising:
   at least one battery cell;
   a switch coupled in series with said host device and said at least one battery cell;
   memory for storing a password;
   means for comparing a data word received from said host device with said password; and
   means for controlling said switch, and said switch being opened upon a predetermined number of occurrences of said data word differing from said password.

2. A battery pack as defined by claim 1, wherein said switch is a transistor.

3. A battery pack as defined in claim 1, wherein said memory is an EEPROM.

4. A battery pack as defined by claim 1, wherein said means for comparing is a microcontroller.

5. A battery pack as defined by claim 1, wherein said means for controlling is a microcontroller.

6. A battery pack as defined by claim 1, further comprising a timer for defining a lock out time period, and wherein said timer begins said lock out time period after said switch is opened, said means for controlling closing said switch upon the occurrence of the end of said lock out time period.

7. A battery pack for powering a host device and having a battery current discharge prevention circuit, said battery pack comprising:
   at least one battery cell;
   a switch coupled in series with said host device and said at least one battery cell;
   a microcontroller circuit having a timer, a memory for storing a password, a communications circuit for receiving a data word from said host device, and a logic circuit for comparing said data word with said password; and
   wherein said timer provides an initial power time period, said microcontroller opening said switch upon either of a predetermined number of occurrences of said data word differing from said password, or the expiration of said initial power time period.

8. A battery pack as defined by claim 7, wherein said switch is a transistor.

9. A battery pack as defined in claim 7, wherein said timer further provides a lock out time period, said microcontroller closing said switch upon he expiration of said lock out time period.

10. A battery pack as defined by claim 7, wherein said memory is non-volatile.

11. A method of preventing use or current discharge of a battery pack by an unauthorized user, said battery pack comprising at least one battery cell, a switch coupled in series with a host device and said at least one battery cell, and a memory for storing a password, said method comprising the steps of:
   detecting the occurrence of electrically connecting said battery pack with said host device;
   timing an initial power time period beginning upon completing said step of detecting;
   receiving a data word from said host device upon completing said step of detecting;
   comparing said data word with said password upon completing said step of receiving;
   opening said switch upon either a predetermined number of occurrences of said data word differing from said password, or the expiration of said initial power period.

12. A method of preventing use of a battery pack as defined by claim 11, further comprising the steps of:
   beginning a lock out time period upon performing said step of opening; and
   closing said switch after the expiration of said lock out time period.

* * * * *